United States Patent [19]

Magria-Deulofeu et al.

[11] 4,294,034
[45] Oct. 13, 1981

[54] ARTICULATED FIGURE TOY

[76] Inventors: Jorge Magria-Deulofeu; Jose Magria-Deulofeu, both of 157, Carretera del Medio, Hospitalet Barcelona, Spain

[21] Appl. No.: 83,962

[22] Filed: Oct. 11, 1979

[30] Foreign Application Priority Data

Nov. 21, 1978 [ES] Spain .................................. 239583

[51] Int. Cl.³ .................. A63H 3/46; A63H 3/20; E05D 1/04
[52] U.S. Cl. ..................................... 46/161; 46/173; D8/323; 16/178
[58] Field of Search ................. 46/161, 159, 163, 162, 46/149, 173, 119, 120; 403/70, 78; D8/323; 16/128 R, 178

[56] References Cited

U.S. PATENT DOCUMENTS

| | | | |
|---|---|---|---|
| 731,138 | 6/1903 | Stearns | 16/178 |
| 2,365,378 | 12/1944 | Benson | 16/178 |
| 2,788,611 | 4/1957 | Wenh | 46/173 |
| 2,804,641 | 9/1957 | Zavado | 16/128 R |
| 3,402,422 | 9/1968 | Baer | 16/128 R |
| 3,718,943 | 3/1973 | Buston | 16/178 |
| 3,900,992 | 8/1975 | Klamer | 46/161 |

*Primary Examiner*—Robert Peshock
*Assistant Examiner*—Michael J. Foycik
*Attorney, Agent, or Firm*—Bacon & Thomas

[57] ABSTRACT

A body for a figure toy has an internal chamber adjacent a wall of the body and an opening through that wall has a cylindrical edge bead constituting a pivot for a simulated limb. The limb has an arcuate portion in the chamber of the same sectional shape as the opening and a recess at the axis of the arcuate portion, which recess pivotally embraces the edge bead.

5 Claims, 3 Drawing Figures

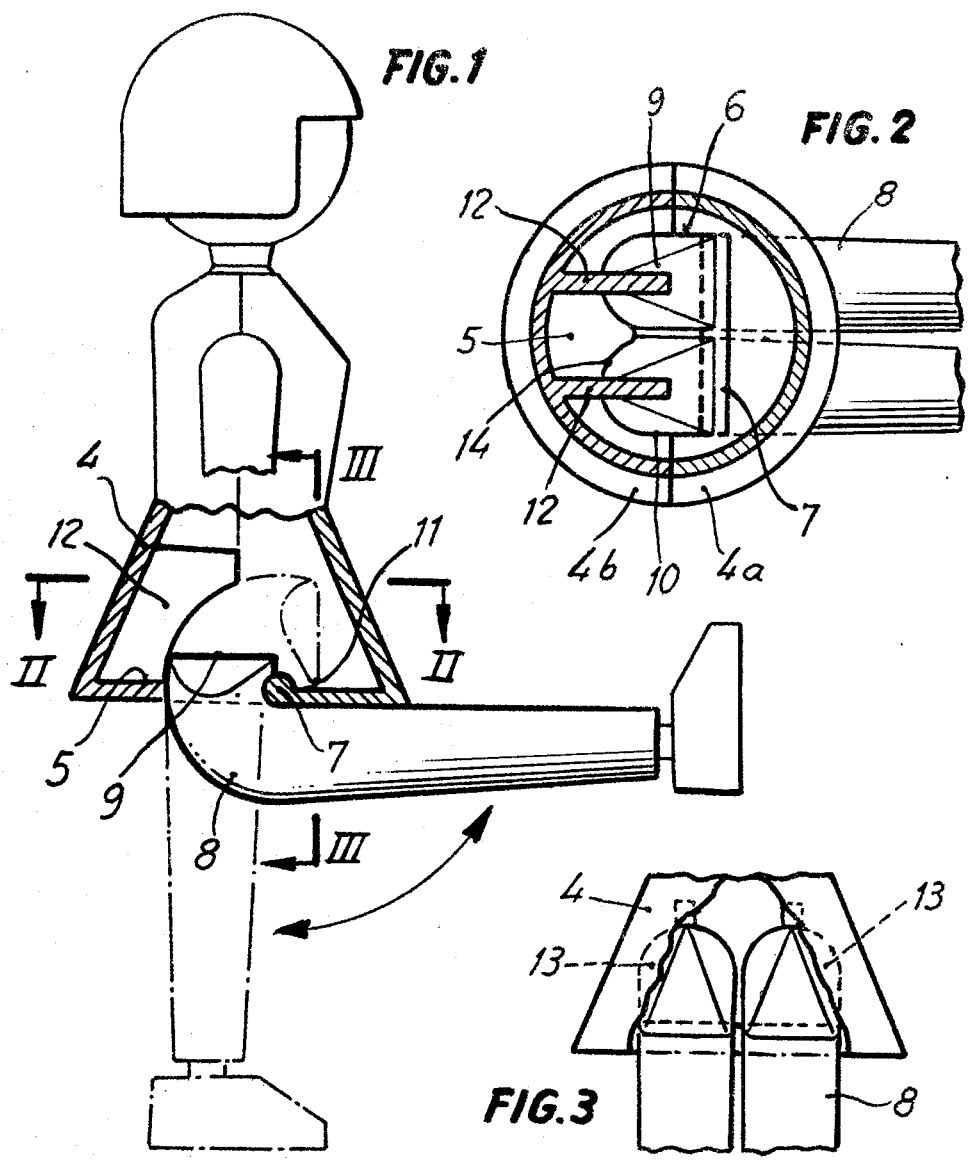

ARTICULATED FIGURE TOY

BACKGROUND OF THE INVENTION

This invention is in the field of articulated figure toys.

Many articulated figure toys have been produced, but in general they involve either complicated formations between the articulated limbs and the body, or separate pivot members requiring considerable labor in assembling the toy.

SUMMARY OF THE INVENTION

The present invention involves a molded figure toy having a chamber therein closely adjacent one side wall of the body and an opening through that side wall into the chamber. A limb extends through the opening and is of essentially the same cross sectional shape as the opening. The limb has a recess in one side, which embraces a cylindrical bead on one edge of the opening to serve as a pivot. It is contemplated that the body be formed of two halves intersecting the opening and to assemble the device the limbs are merely placed in position on one half and the second half of the body is then placed in position to lock the limb in place, although pivotally extending through the opening.

BRIEF DESCRIPTION OF THE DRAWINGS

In the drawings,

FIG. 1 is a view, partly in section, showing the present invention.

FIG. 2 is a transverse sectional view taken along line II—II of FIG. 1, and

FIG. 3 is a fragmentary front view of a portion of the device with portions of the body broken away.

DESCRIPTION OF A PREFERRED EMBODIMENT

In the drawings, numeral 4 indicates generally the body or torso portion of a figure toy and made up of a rear half 4b and a front half 4a, and which has a chamber therein closely adjacent the bottom of the body, defining a wall 5. This wall 5 normally closes the bottom of the chamber, but is provided with an opening 6 therethrough for each leg. The front edge of each opening 6 is in the form of a cylindrical bead 7 extending upwardly somewhat into the chamber, whereas the remainder of the opening is of different shape, best seen in FIG. 2 wherein the side portions of the openings extending from the bead 7 are essentially straight and a semicircular rear edge portion 14 is provided which corresponds to the cross sectional contour of legs 8, at least in the upper regions and which are shown as being of the same shape.

The upper end 9 of each leg fits snugly in the opening 6, but the forward edges are provided with recesses embracing the bead 7. The upper ends of the legs 8 are bent forwardly as shown in the dotted line position of FIG. 1, with the forwardly bent portion within the chamber referred to. Thus, the rear or outer surface of each leg portion is of arcuate or generally toric configuration and slidingly engages the rear or curved edge of the opening 6. The outer surfaces of the upper portions of the legs thus define a surface of revolution about the axis of the pivot bead 7. The forwardly bent portion of each leg extends forwardly when the legs are vertical and extend beyond or forwardly of the bead 7 and lower surfaces thereof constitute stops limiting rearward swinging of the legs to the vertical position shown by broken lines in FIG. 1. Those surfaces are identified by numeral 11 in the drawings.

Within the chamber, ribs 12 are integrally molded substantially in line with the center of each of the legs and each rib is provided with an arcuate inner edge portion concentric to the axis of bead 7 and serving to guide the curved portion of the legs during pivotal movement, and to insure that the legs be properly inserted in the doll during assembly thereof.

The body 4 is shown as formed in two parts: a rear portion 4b and a forward portion 4a. To assemble the device, the legs are placed in the opening 6 of the rear portion and the forward portion is then placed in position to insert the beads in the recesses previously described and the body portions are then permanently secured together by adhesive or the like. The legs 8 are limited in their pivotal movement to a vertical position as shown in broken lines in FIG. 1 by the surface 11 engaging the wall 5, and they are limited to 90° rotation in a forward direction by the lower surface of the wall 5 engaging the legs themselves, as shown in solid line in the figure. The forward portion of the forwardly bent ends of the legs are beveled as shown at 13 to insure complete pivotal movement after the body is assembled, since the chamber in the body is of generally conical shape, as clearly evident from FIG. 3.

While a single specific embodiment of the invention has been shown and described herein, it is to be understood that the same is merely illustrative and that other forms may be resorted to within the scope of the appended claims.

We claim:

1. A figure toy comprising:
   a body portion having a chamber therein adjacent a wall of said body;
   at least one opening through said wall into said chamber, one edge of said opening defining a cylindrical bead a portion of which extends into said chamber;
   a simulated limb having an end portion extending through said opening and having a cylindrical recess in one side thereof pivotally embracing said bead; and
   the cross sectional size and shape of said end portion of said limb in the region of said recess being substantially the same as the size and shape of said opening, stop means on said limb, in said chamber and on the same side of said limb as said recess arranged to abut the inner surface of said wall and thereby limit pivotal movement of said limb about said bead in one direction in a position substantially perpendicular to said wall.

2. A figure toy as defined in claim 1 wherein said stop means comprises a surface extending at substantially right angles to said one side of said limb, said limb being pivotal about said bead, in the other direction, to bring said one side of said limb against the outer surface of said wall and thereby limit pivotal movement of said limb in said other direction.

3. A figure toy as defined in claim 1 wherein the portion of said limb within said chamber is so configured that the side thereof opposite said recess defines a surface revolution concentric to the axis of said recess.

4. A figure toy as defined in claim 3 wherein said surface of revolution is a toric surface.

5. A figure toy as defined in claim 3 including a rib in said chamber, integral with said body, having an arcuate edge slidably engaging said surface of revolution, said edge being concentric to the axis of said bead.

* * * * *